(12) United States Patent
Fujita et al.

(10) Patent No.: US 8,081,559 B2
(45) Date of Patent: Dec. 20, 2011

(54) RECORDING AND REPRODUCING APPARATUS AND RECORDING MEDIUM

(75) Inventors: Masao Fujita, Osaka (JP); Kenji Tanaka, Osaka (JP); Shinji Kawakami, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 410 days.

(21) Appl. No.: 11/960,439

(22) Filed: Dec. 19, 2007

(65) Prior Publication Data

US 2008/0151712 A1  Jun. 26, 2008

(30) Foreign Application Priority Data

Dec. 20, 2006 (JP) ................. 2006-343190

(51) Int. Cl.
*G11B 7/00* (2006.01)
(52) U.S. Cl. ................. 369/124.04
(58) Field of Classification Search .......... None
See application file for complete search history.

(56) References Cited

U.S. PATENT DOCUMENTS

| 6,473,377 | B2 * | 10/2002 | Eguchi et al. | 369/47.47 |
| 6,624,987 | B1 * | 9/2003 | Hayashi et al. | 360/324.2 |
| 7,029,726 | B1 | 4/2006 | Chen et al. | |
| 7,153,366 | B1 | 12/2006 | Chen et al. | |
| 2002/0141103 | A1 | 10/2002 | Saliba et al. | |
| 2002/0167751 | A1 | 11/2002 | Lee et al. | |
| 2002/0186496 | A1 | 12/2002 | Saliba et al. | |
| 2006/0072876 | A1 * | 4/2006 | Kikushima | 385/31 |

FOREIGN PATENT DOCUMENTS

JP  60-43216 A  3/1985
JP  11-339254 A  12/1999

* cited by examiner

*Primary Examiner* — Joseph Feild
*Assistant Examiner* — Parul Gupta
(74) *Attorney, Agent, or Firm* — Birch, Stewart, Kolasch & Birch, LLP

(57) ABSTRACT

The present invention provides a recording and reproducing apparatus that can perform high-precision tracking servo control by removing noise from detected servo signals. The recording and reproducing apparatus performs tracking servo control while reading servo signals 10 that are formed on a surface 9 of a recording medium 2 so as to produce optical contrast, the apparatus including a modulated irradiator 20 for irradiating the servo signals 10 with a light beam, the intensity of the light beam being modulated by a modulating wave that is frequency-modulated; a photoelectric converter 30 for converting reflected light from the servo signals 10 into electric signals; and a synchronous demodulator 15 for subjecting the electrical signal to synchronous demodulation using the modulating wave as a reference wave.

7 Claims, 5 Drawing Sheets

RECORDING AND REPRODUCING APPARATUS AND RECORDING MEDIUM

BACKGROUND OF THE INVENTION

1. Field of the Invention

The present invention relates to a recording and reproducing apparatus provided with a tracking servomechanism based on an optical means. More particularly, the present invention relates to a recording and reproducing apparatus that can perform precise tracking servo control by reducing the influence of noise contained in detected servo signals and a recording medium used for use in the recording and reproducing apparatus.

2. Description of Related Art

Magnetic tape, which is an example of a recording medium, is used for various purposes, such as audiotapes, videotapes, and computer tapes. Particularly, in the field of tapes for data backup, data backup tapes with storage capacities of several hundred GB per reel are being produced commercially as the capacities of hard disks to be backed up increases. Thus, increasing the capacities of backup tapes is essential for supporting further increases in the capacities of hard disks in the future.

Approaches for increasing the capacity of a recording medium include a method of increasing the linear recording density, a method of increasing the track density, a method of increasing the recording area, and a method of improving the recording efficiency through signal processing. Generally, these methods are combined so that an optimal balance is achieved.

In the method of increasing the track density, a technique to ensure the positioning accuracy of a recording and reproducing head by means of closed loop control based on a tracking servo has been established. In an optical servo, which is an example of the tracking servo, servo signals formed by grooves or concavities/convexities are provided on a data recording surface or a surface opposite to the data recording surface. These servo signals are irradiated with a laser beam, reflected light from the servo signals is photoelectrically converted to obtain electric signals, and tracking control is performed based on the obtained electric signals (for example, JP H11-339254A).

On the other hand, in a recording and reproducing apparatus based on a rotating head system, recording/reproduction tracks are obliquely provided on a recording surface of a magnetic tape. In this configuration, there is proposed a recording and reproducing apparatus in which recording tracks are made to wobble and tracking servo signals are obtained by synchronously detecting reproducing signals during reproduction so that a reproducing head can accurately follow on the recording tracks (for example, JP S60-43216A).

However, in recent data media with increased capacities, the data track width has been narrowed, or in other words, the track density has been increased, and the recording density when writing data has been increased. To cope with this trend, servo signals are also required to be of extremely high precision. For example, in recording and reproducing apparatuses employing optical servos, concavities/convexities of servo signals provided on a recording surface are made finer.

For this reason, electric signals obtained by detecting reflected light from concavities/convexities become extremely weak, so that with conventional detecting methods, the signal-to-noise ratio decreases, and there is a problem that accurate tracking servo control is difficult.

Moreover, tapes of recent years have extremely large capacities, such as 1 TB or more, and also have extremely narrow data track widths, of the order of 5.0 μm. In addition, servo pits for generating servo signals are accordingly formed more densely or the servo pit area itself is reduced, and thus more complex servo signals are used. Therefore, performing servo tracking precisely is a major issue, and there is a need for a method that can cope with a further increase in the data capacity in the future.

Moreover, the tracking servo system proposed in JP S60-43216A, in which system recording tracks are made to wobble, is a totally different servo system from the optical servo, which is based on reflected light from servo signals. Thus, JP S60-43216A does not propose any improvement of the precision in optical servos.

SUMMARY OF THE INVENTION

The present invention has been conceived to solve conventional problems as described above, and it is an object of the present invention to provide a recording and reproducing apparatus that can perform high-precision tracking servo control by removing noise from detected servo signals and a recording medium for use in the recording and reproducing apparatus.

To achieve the object, a recording and reproducing apparatus of the present invention is a recording and reproducing apparatus that performs tracking servo control while reading servo signals that are formed on a surface of a recording medium so as to produce optical contrast, the apparatus including a modulated irradiator for irradiating the servo signals with a light beam, the intensity of the light beam being modulated by a modulating wave that is frequency-modulated; a photoelectric converter for converting reflected light from the servo signals into electric signals; and a synchronous demodulator for subjecting the electrical signal to synchronous demodulation using the modulating wave as a reference wave.

A recording medium of the present invention is a recording medium for the recording and reproducing apparatus, wherein the servo signals are formed along the direction of travel of the recording medium.

DETAILED DESCRIPTION OF THE INVENTION

The recording and reproducing apparatus of the present invention subject output signals based on reflected light from servo signals to synchronous demodulation using a modulating wave for modulating the intensity of a light beam from the modulated irradiator as a reference wave. With this configuration, noise at frequencies other than the frequency of the modulating wave is cut off from the output signals, so that accurate signals without noise can be obtained. Thus, high-precision tracking servo control can be performed by removing noise from detected servo signals.

In the recording and reproducing apparatus of the present invention, it is preferable that the frequency of the modulating wave is greater than V/L, where L represents the distance between the servo signals and V represents the traveling speed of the recording medium. With this configuration, electric signals based on the reflected light become more stable, so that the precision of servo signal detection can be increased even more.

Moreover, it is preferable that the light beam emitted by the modulated irradiator is a laser beam generated by a semiconductor laser, and the intensity of the laser beam is modulated by an optical module.

Moreover, it is preferable that the light beam emitted by the modulated irradiator is a laser beam generated by a semiconductor laser, a driving current of the semiconductor laser is modulated by the modulating wave, and the intensity of the laser beam is modulated based on the waveform of the driving current of the semiconductor laser.

Moreover, it is preferable that the recording medium has a data track width of 5 µm or less.

In the recording medium, it is preferable that the recording medium has a data track width of 5 µm or less.

Figure 1:
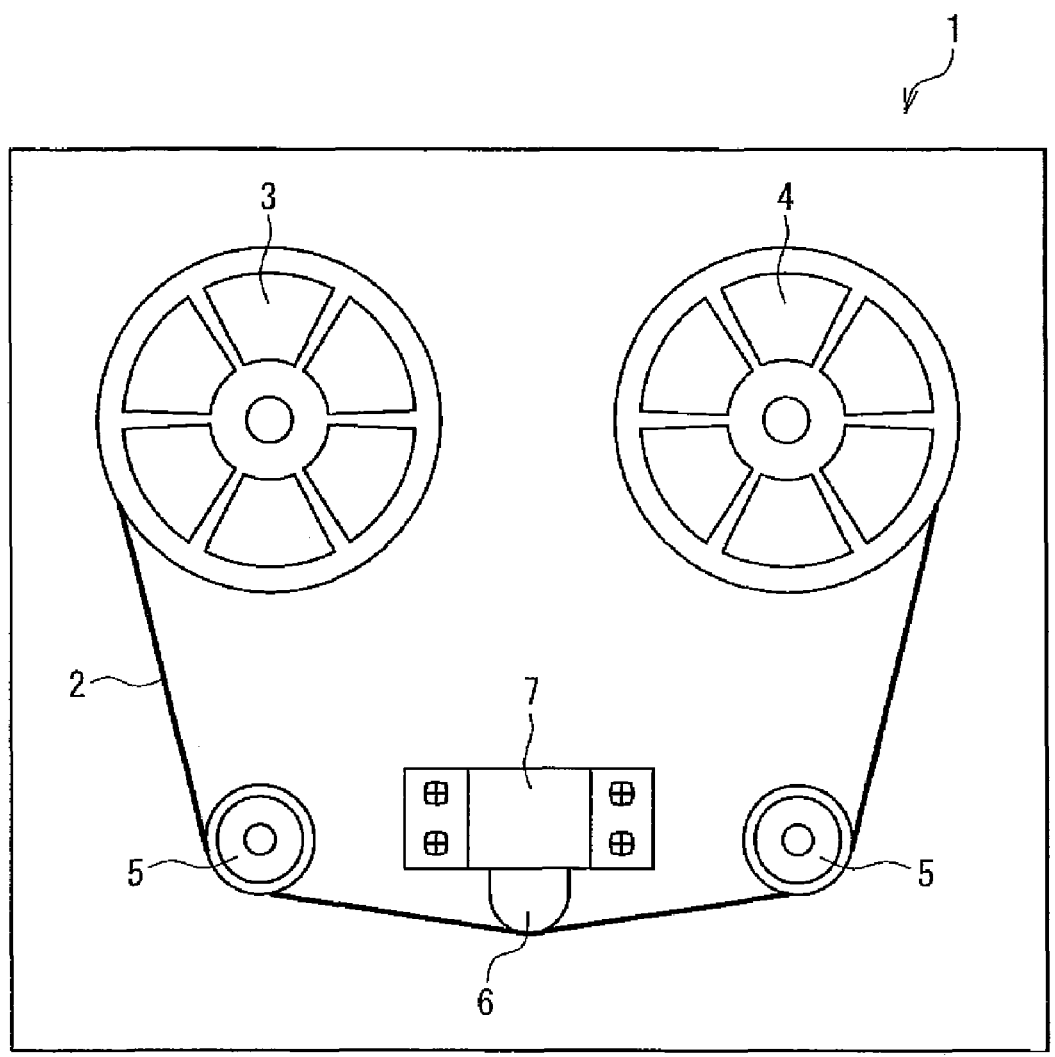
FIG. 1 is a diagram schematically showing a configuration of a magnetic tape apparatus according to an embodiment of the present invention.

Hereinafter, an embodiment of the present invention will be described with reference to the drawings. FIG. 1 is a diagram schematically showing a configuration of a magnetic tape apparatus according to the embodiment of the present invention. The magnetic tape apparatus 1, which is a recording and reproducing apparatus, includes a magnetic tape supply portion 3 from which a magnetic tape 2 is drawn out and a magnetic tape take-up portion 4 onto which the magnetic tape 2 is wound. Guide rolls 5 and a head block 6 are provided between the magnetic tape supply portion 3 and the magnetic tape take-up portion 4. The guide rolls 5 transport the magnetic tape 2 along a specific path. The head block 6 is equipped with a recording and reproducing head.

The head block 6 is further provided with a servo signal detection mechanism (not shown). Based on servo signals detected by the servo signal detection mechanism, the head block 6 is driven by a drive mechanism 7 in the width direction of the magnetic tape 2. Thus, the recording and reproducing head can accurately trace recording/reproduction tracks.

Figure 2:
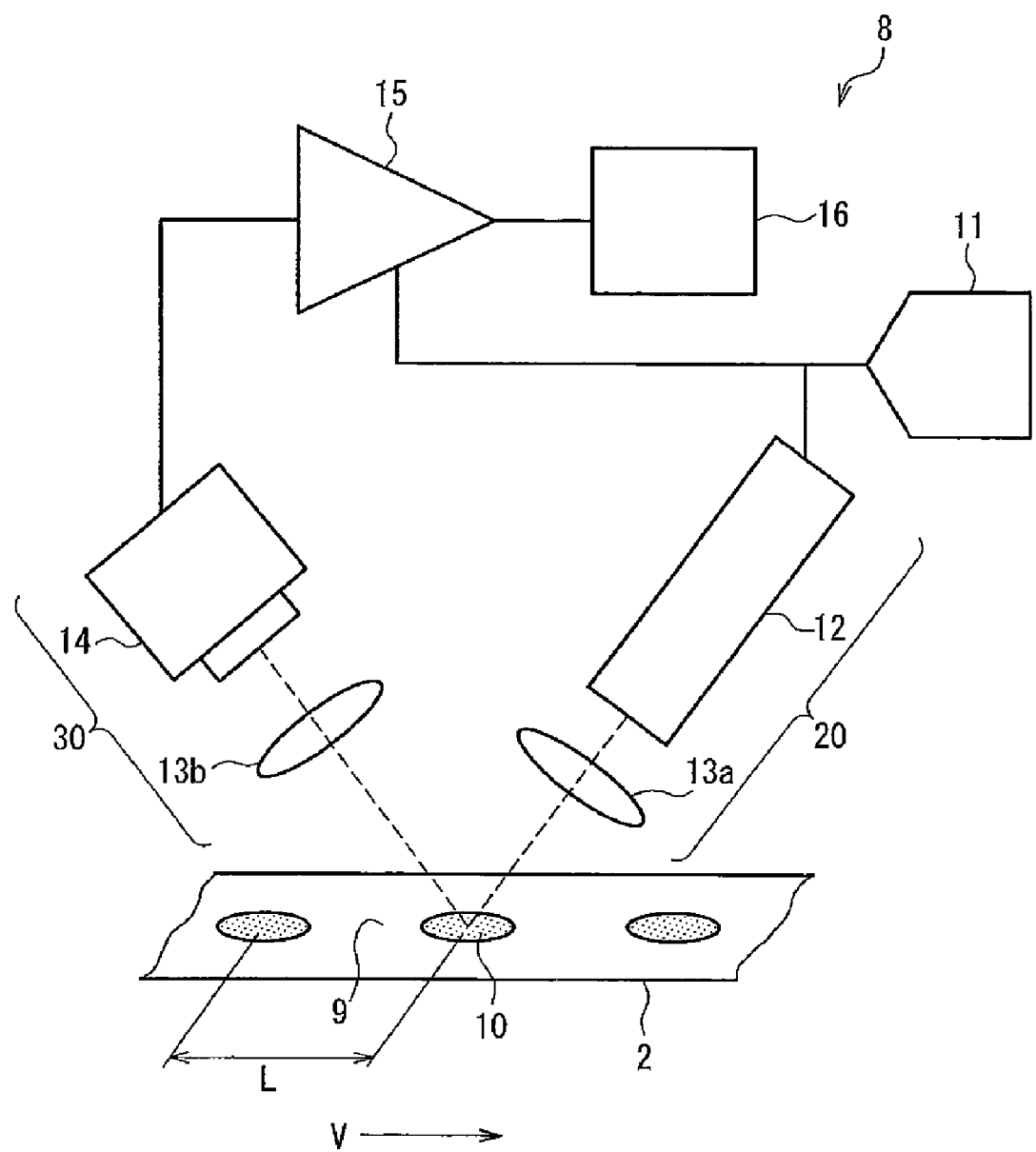
FIG. 2 is a diagram schematically showing a configuration of a servo signal detection mechanism according to the embodiment of the present invention.

FIG. 2 is a diagram schematically showing a configuration of the servo signal detection mechanism 8. The servo signal detection mechanism 8 includes a modulating signal generator 11, a modulated irradiator 20, a photoelectric converter 30, a synchronous demodulator (synchronous demodulation amplifier 15), and a tracking error signal detection circuit 16.

The modulated irradiator 20 irradiates servo pits 10 (servo signals) formed on a magnetic tape surface 9 with a light beam, the intensity of which is modulated by a frequency-modulated modulating wave. In the example shown in FIG. 2, the modulated irradiator 20 includes the modulating signal generator 11, a semiconductor laser 12, and an optical lens 13a. A light beam emitted from the semiconductor laser 12 according to a signal from the modulating signal generator 11 passes through the optical lens 13a and is irradiated onto the servo pits 10.

In the example shown in FIG. 2, the servo pits 10 are concave portions formed on the magnetic tape surface 9. This results in concavities/convexities being formed on the magnetic tape surface 9 along the direction of travel of the magnetic tape. Thus, there is a difference in the reflectance between the magnetic tape surface 9 (convex portions) and the servo pits 10 (concave portions), which causes optical contrast.

The photoelectric converter 30 converts reflected light from the servo pits 10 into electric signals. In the example shown in FIG. 2, the photoelectric converter 30 includes an optical lens 13b and a photodetector 14. The reflected light from the servo pits 10 passes through the optical lens 13b and is detected by the photodetector 14 and converted into electric signals.

The synchronous demodulation amplifier 15, which is the synchronous demodulator, synchronously detects the electric signals converted by the photodetector 14 using the modulating wave generated by the modulating signal generator 11 as a reference wave.

Although the servo pits 10 are formed on the magnetic tape surface 9, the magnetic tape surface 9 on which the servo pits 10 are formed may be on the side of a data signal recording surface or on the side opposite to the data signal recording surface, among the surfaces of the magnetic tape. In either case, the surface on which the servo pits 10 are formed is irradiated with a laser beam.

When the servo pits 10 are formed on the side of the data signal recording surface, a head for reading data signals and a head (servo signal detection mechanism) for reading the servo pits 10 of the head block 6 are disposed side by side. Usually, these two heads are integrated together as a head assembly.

On the other hand, when the servo pits 10 are formed on the side opposite to the data signal recording surface, the head for reading data signals and the head for reading the servo pits 10 are disposed facing each other with the magnetic tape 2 therebetween. In the case where these two heads are integrated together as a head assembly, the head assembly is formed, for example, in a U shape in such a manner that the head assembly straddles the magnetic tape 2.

Figure 3A:
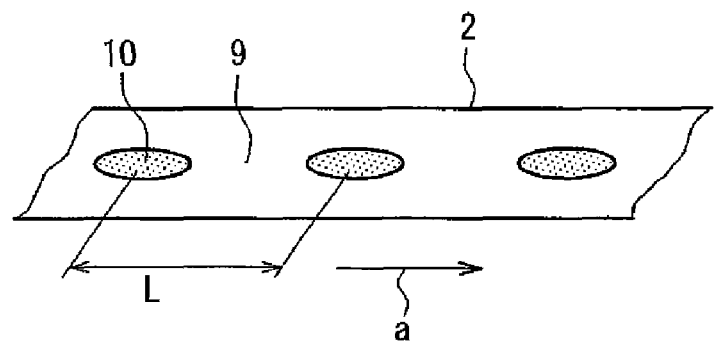
FIG. 3A is a diagram showing servo pits on a surface of a magnetic tape according to the embodiment of the present invention.

Hereinafter, the operation of the servo signal detection mechanism 8 shown in FIG. 2 will be described with reference to FIGS. 3A to 3D. FIG. 3A shows the servo pits 10 on the surface 9 of the magnetic tape 2.

Figure 3B:
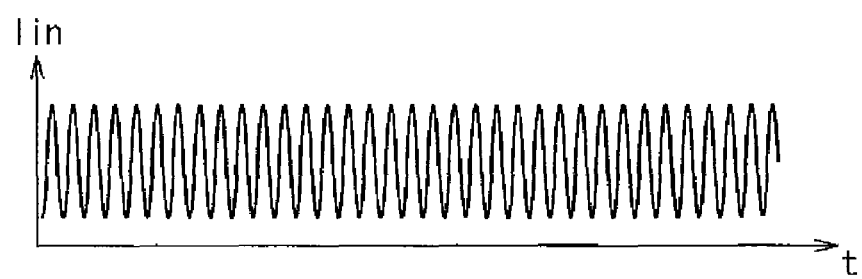
FIG. 3B is a diagram showing a waveform of a semiconductor laser driving current according to the embodiment of the present invention.

FIG. 3B shows a waveform of a semiconductor laser driving current Iin. The driving current of the semiconductor laser 12 is intensity-modulated by the modulating signal generator 11 using a modulating wave that is frequency-modulated. The intensity of the laser beam is modulated based on the waveform of this driving current.

In FIG. 3A, a laser beam generated by the semiconductor laser 12 is focused by the optical lens 13a and irradiated onto the servo pits 10 on the magnetic tape 2 traveling in the direction of arrow (see FIG. 2).

Preferably, the frequency of the modulating signal is higher than a frequency (V/L) calculated from the distance L between the servo pits 10 and the traveling speed V (the speed V at which the servo pits 10 pass under the servo signal detection mechanism 8). As a result, electric signals based on the reflected light become more stable, so that the precision of servo signal detection can be increased even more.

More specifically, the frequency of the modulating signal is preferably not less than twofold, more preferably not less than fivefold, and most preferably not less than tenfold the frequency (V/L).

For example, when the distance L between the servo pits 10 is 100 μm and the relative speed between the magnetic tape 2 and a magnetic head is 5 m/second, the frequency (V/L) is 50 kHz. Therefore, the frequency of the modulating signal preferably is a value higher than 50 kHz, more preferably 100 kHz or more, even more preferably 250 kHz or more, and most preferably 500 kHz or more.

Figure 3C:
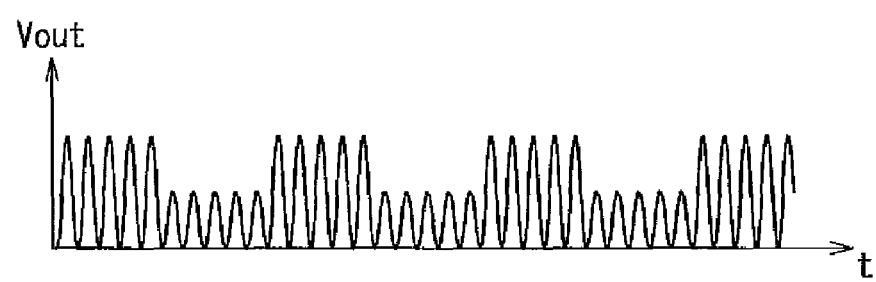
FIG. 3C is a schematic diagram of an output voltage of a photodetector.
Figure 5A:
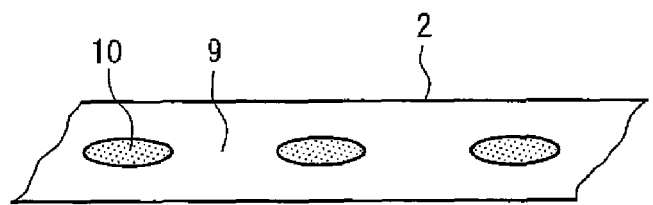
FIG. 5A is a diagram showing servo pits on a surface of a magnetic tape according to a comparative example.
Figure 5B:
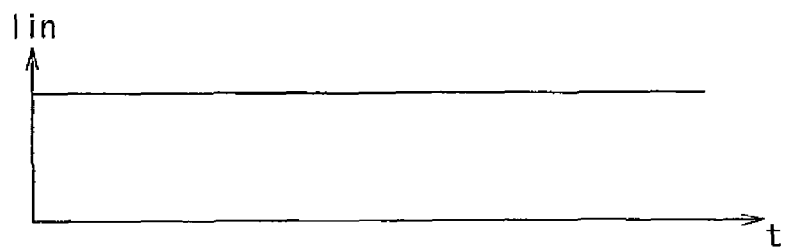
FIG. 5B is a diagram showing a waveform of a semiconductor laser driving current according to the comparative example.
Figure 5C:
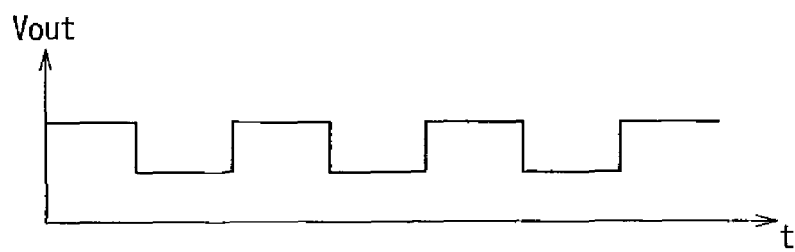
FIG. 5C is a schematic diagram of an output voltage of a photodetector.

As described above, reflected light from the servo pits 10 is focused by the optical lens 13b to enter the photodetector 14 and converted into electric signals. FIG. 3C shows a schematic diagram of an output voltage Vout of the photodetector 14. According to the optical contrast between the magnetic tape surface 9 and the servo pits 10, the magnitude of the output voltage Vout varies. In FIG. 5C, portions where the amplitude value of the output voltage Vout is small correspond to portions where the servo pits 10 are formed.

As the photodetector 14, a known detector can be used. In this case, it is preferable to use a four-quadrant photodetector in order to facilitate position detection of the servo pits 10. However, the photodetector 14 is not intended to be limited thereto, and detectors employing other systems may be used.

Figure 5D:
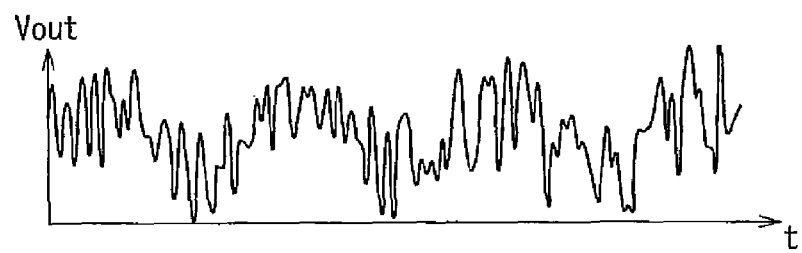
FIG. 5D is a schematic diagram showing that an output voltage of the photodetector according to the comparative example contains noise.

The electric signals from the photodetector 14 are synchronously detected by the synchronous demodulation amplifier 15 using the modulating wave (FIG. 3B) generated by the modulating signal generator 11 as a reference wave. FIG. 5D shows an output voltage Vdet after the synchronous detection.

The example of the output voltage Vout shown in FIG. 5C shows an ideal output waveform without noise, but an output voltage Vdet as shown in FIG. 5D can be obtained even when the output voltage Vout contains noise.

That is to say, since noise at frequencies other than the frequency of the modulating wave is cut off from the output voltage Vout by performing synchronous detection using the modulating wave shown in FIG. 3B as a reference wave, accurate electric signals without noise can be obtained.

Figure 4A:
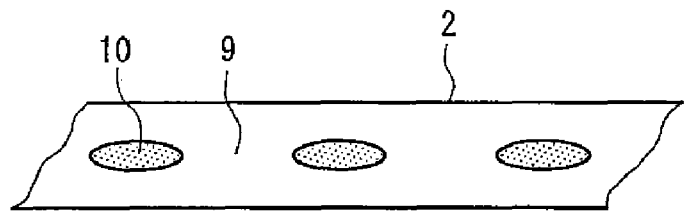
FIG. 4A is a diagram showing the servo pits on the surface of the magnetic tape according to the embodiment of the present invention.
Figure 4B:
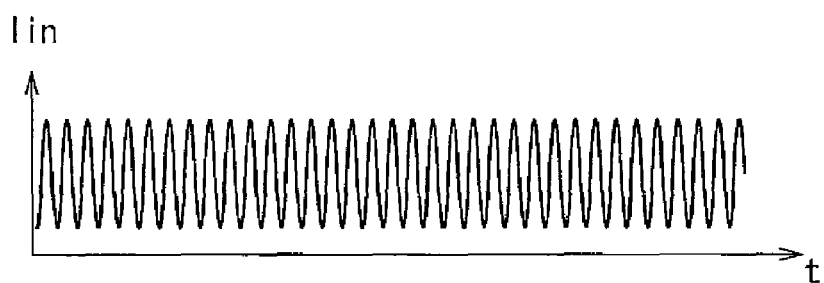
FIG. 4B is a diagram showing a waveform of the semiconductor laser driving current according to the embodiment of the present invention.

Hereinafter, cutting off of noise will be specifically described with reference to FIGS. 4A to 4D and 5A to 5D. FIG. 4A shows the servo pits 10 on the surface 9 of the magnetic tape 2. FIG. 4B shows a waveform of the semiconductor laser driving current Iin. These drawings are the same as FIGS. 3A and 3B.

Figure 4C:
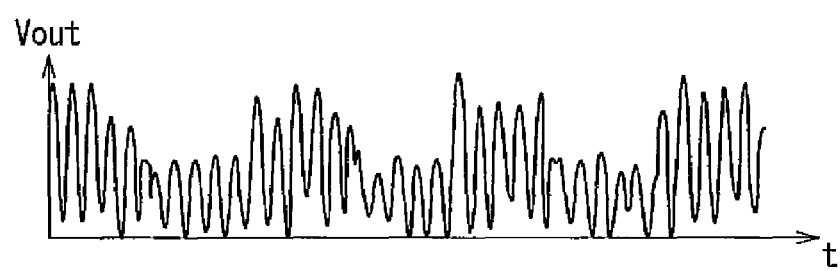
FIG. 4C is a schematic diagram of an output voltage of the photodetector.

FIG. 4C shows a schematic diagram of an output voltage Vout of the photodetector 14. When compared with FIG. 3C, it can be seen that the waveform experiences disturbance due to noise. Such noise is more likely to occur as, for example, the arrangement of the servo pits 10 is made finer.

Figure 4D:
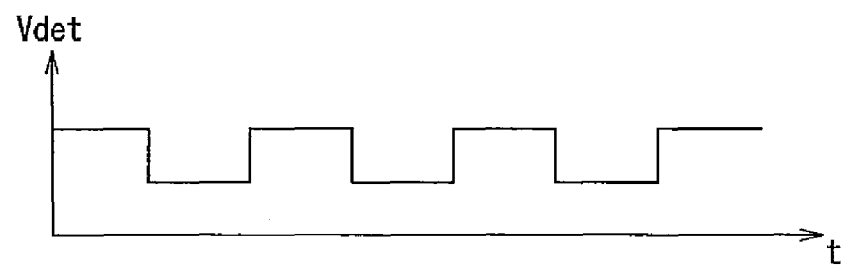
FIG. 4D is a diagram showing an output voltage after synchronous detection.

FIG. 4D shows an output voltage Vdet after synchronous detection. The waveform in this drawing is similar to that of FIG. 5D, and it can be seen that noise has been removed. Specifically, even when the output voltage Vout contains noise as shown in FIG. 4C, accurate electric signals without noise can be obtained as shown in FIG. 4D by performing synchronous detection using the modulating wave shown in FIG. 4B as a reference wave. This is because noise at frequencies other than the frequency of the modulating wave shown in FIG. 4B is cut off from the output voltage Vout as described above.

When servo signals can be detected accurately in this manner, tracking servo control is also performed accurately. Specifically, as shown in FIG. 2, electric signals based on the servo signals detected by the synchronous detection amplifier 15 are sent to the tracking error signal detection circuit 16 and calculated and converted into electric signals corresponding to the amounts of displacement between the magnetic head and the servo pits 10. The head block 6 in FIG. 1 is driven by the drive mechanism 7 in the width direction of the magnetic tape 2 according to the converted electric signals and controlled so that the recording and reproducing head can accurately trace the recording/reproduction tracks.

Next, a comparative example of tracking error signal detection will be described. FIG. 5A shows servo pits 10 on a surface 9 of a magnetic tape 2. This drawing is similar to FIGS. 3A and 4A. FIG. 5B shows a semiconductor laser driving current Iin. In this comparative example, the intensity of the laser beam is not frequency-modulated, and thus the driving current Iin is represented as a straight line.

FIG. 5C shows a schematic diagram according to an example of the output voltage Vout of a photodetector. This output voltage is obtained based on the difference in reflectance between the magnetic tape surface 9 where the servo pits 10 are not formed and the servo pits 10 as is the case with FIGS. 3A to 3D and 4A to 4D. When a clear servo signal such as this is obtained, no problems arise in the tracking servo control.

However, when the arrangement of the servo pits 10 is made finer as described above, the influence of making the servo pit arrangement finer appears in the output voltage Vout of the photodetector. FIG. 5D shows an example of such a case. The waveform in FIG. 5D contains a high level of noise and is unstable. Accordingly, when using such an output voltage, accurate tracking servo control is difficult.

Figure 3D:
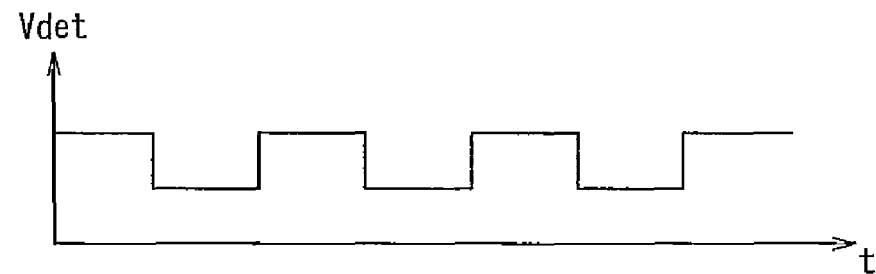
FIG. 3D is a diagram showing an output voltage after synchronous detection.

It is, however, possible to solve the problem with the servo signal detection system shown in FIGS. 5A to 5D by using the servo signal detection system according to this embodiment as described by means of FIGS. 3A to 3D and 4A to 4D. That is to say, even when an output voltage Vout containing noise as shown in FIG. 5D is detected, accurate servo signals without noise as shown in FIGS. 3D and 4D can be obtained by performing synchronous detection using the modulating wave for driving the semiconductor laser as a reference wave, as described above.

Although the foregoing embodiment has been described the light beam from the semiconductor laser 12 is intensity-modulated by the modulating signal generator 11, an optical module may be disposed between the semiconductor laser 12 and the optical lens 13a in FIG. 2.

More specifically, the emitted light from the semiconductor laser 12 may be intensity-modulated with modulation waves having a predetermined frequency by the optical module which is a modulator comprised of two polarizing plates which are relatively repeatedly rotated back and forth within a predetermined angular range with a predetermined rotational speed.

The optical module in this case comprises two polarizing plates provided on the same axis, for example. One of the two polarizing plates is connected to a pulse motor so that the polarizing plate is driven and rotated. By inputting a modulation signal to the pulse motor, the polarizing plate connected to the pulse motor is repeatedly rotated back and forth within the predetermined angular range with the predetermined rotational speed.

Note that the optical module 2 above is only for illustrative purposes and the present invention is not limited to this. Any means capable of intensity-modulating the emitted light may be used. For example, the polarizing plate may be continuously rotated in a single direction by a motor instead of repetitive back-and-forth rotation.

There is no particular limitation regarding the magnetic recording medium to be used, but when a high-density recording medium having a recording density when writing of 169 kfci or more is used, the effect of employing the recording and reproducing apparatus of this embodiment is particularly apparent. The reason for this is that since the track width becomes as small as 5.0 µm or less as the recording density is increased, inevitably the servo pit area is reduced, or the distance between servo pits become narrow and close, and with the method of the above-described comparative example, servo signals thus have a low signal-to-noise ratio and are difficult to read.

Although the foregoing embodiment has been described using a magnetic tape apparatus as an example of the recording and reproducing apparatus, this is not intended to be limiting. That is to say, the recording and reproducing apparatus that can be used for the present invention can be any recording and reproducing apparatus that performs tracking servo control while reading servo signals that are formed so as to produce optical contrast.

Moreover, although the servo signals have been described as using concave portions formed on a recording medium as an example, the servo signals may be formed by grooves. However, this is not intended to be limiting, and the servo signals can be any configuration that produces optical contrast.

Moreover, a light source is not limited a semiconductor laser, for example, He—Ne laser may be used as the light source.

According to the present invention, high-precision tracking servo control can be performed by removing noise from detected servo signals, and the present invention is therefore useful in, for example, a magnetic tape apparatus.

The invention may be embodied in other forms without departing from the spirit or essential characteristics thereof. The embodiment disclosed in this application is to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A recording and reproducing, the apparatus comprising:
   a modulated irradiator for irradiating the servo pits with a light beam, the intensity of the light beam being modulated by a modulating wave with the wavelength of the light beam unchanged;
   a photoelectric converter for converting reflected light from the servo pits into electric signals;
   a synchronous demodulator for subjecting the electrical signal to synchronous demodulation using the modulating wave;
   wherein the recording and reproducing apparatus performs tracking servo control while reading servo pits that are formed so as to produce optical contrast by a concavo-convex structure on a surface of a recording medium; and
   a frequency of the modulating wave is higher than a frequency (V/L) calculated from a distance L between the servo pits and a traveling speed V of the recording medium.

2. The recording and reproducing apparatus according to claim 1, wherein the light beam emitted by the modulated irradiator is a laser beam generated by a semiconductor laser, and the intensity of the laser beam is modulated by an optical module.

3. The recording and reproducing apparatus according to claim 1, wherein the light beam emitted by the modulated irradiator is a laser beam generated by a semiconductor laser, a driving current of the semiconductor laser is modulated by the modulating wave, and the intensity of the laser beam is modulated based on the waveform of the driving current of the semiconductor laser.

4. The recording and reproducing apparatus according to claim 1, wherein the recording medium has a data track width of 5 µm or less.

5. A recording medium for the recording and reproducing apparatus according to claim 1, wherein the servo pits are formed along the direction of travel of the recording medium.

6. The recording medium according to claim 5, wherein the recording medium has a data track width of 5 µm or less.

7. The recording and reproducing apparatus according to claim 1, wherein the frequency of the modulating wave is not less that twofold of the frequency (V/L).

* * * * *